(12) United States Patent
Takasumi

(10) Patent No.: US 11,134,234 B2
(45) Date of Patent: Sep. 28, 2021

(54) IMAGE PROCESSING APPARATUS, IMAGE PROCESSING METHOD, AND RECORDING MEDIUM

(71) Applicant: Olympus Corporation, Hachioji (JP)

(72) Inventor: Shinya Takasumi, Akiruno (JP)

(73) Assignee: Olympus Corporation, Tokyo (JP)

( * ) Notice: Subject to any disclaimer, the term of this patent is extended or adjusted under 35 U.S.C. 154(b) by 249 days.

(21) Appl. No.: 16/523,991

(22) Filed: Jul. 26, 2019

(65) Prior Publication Data

US 2019/0349557 A1 Nov. 14, 2019

Related U.S. Application Data

(63) Continuation of application No. PCT/JP2018/000811, filed on Jan. 15, 2018.

(30) Foreign Application Priority Data

Feb. 27, 2017 (JP) .............................. JP2017-034594

(51) Int. Cl.
*H04N 9/73* (2006.01)

(52) U.S. Cl.
CPC ..................... *H04N 9/73* (2013.01)

(58) Field of Classification Search
CPC .................................. H04N 9/04; H04N 9/73
See application file for complete search history.

(56) References Cited

U.S. PATENT DOCUMENTS

| 6,035,652 | A  | * | 3/2000  | Hashimoto | ............ | F02D 41/083 |
|           |    |   |         |           |              | 123/339.17  |
| 6,215,468 | B1 | * | 4/2001  | Van Mourik | ............ | H04N 9/69  |
|           |    |   |         |           |              | 345/605     |
| 6,297,835 | B1 | * | 10/2001 | Li        | .......................... | G09G 5/026 |
|           |    |   |         |           |              | 345/600     |
| 7,777,759 | B2 | * | 8/2010  | Yoshida   | ................. | H04N 5/202 |
|           |    |   |         |           |              | 345/600     |
| 2010/0110222 | A1 | * | 5/2010 | Smith   | ................ | H04N 1/32603 |
|           |    |   |         |           |              | 348/222.1   |
| 2015/0304619 | A1 |   | 10/2015 | Takasumi |              |             |

FOREIGN PATENT DOCUMENTS

| JP | 2008-160291 A | 7/2008 |
|----|---------------|--------|
| JP | 4706635 B2    | 6/2011 |
| JP | 2013-223061 A | 10/2013 |
| JP | 2015-207825 A | 11/2015 |

OTHER PUBLICATIONS

International Search Report from corresponding International Application No. PCT/JP2018/000811, dated Mar. 27, 2018 (1 pg.), with translation (1 pg.).

* cited by examiner

*Primary Examiner* — Nay A Maung
*Assistant Examiner* — Jose M Torres
(74) *Attorney, Agent, or Firm* — John C. Pokotylo; Pokotylo Patent Services

(57) ABSTRACT

An image processing apparatus includes a processor including hardware, the processor being configured to extend an N-bit color video signal to an M (M>N)-bit color video signal, subject the M-bit color video signal obtained by the extension to level correction based on (M−N), and subject the color video signal subjected to the level correction to white balance correction.

11 Claims, 9 Drawing Sheets

IMAGE PROCESSING APPARATUS, IMAGE PROCESSING METHOD, AND RECORDING MEDIUM

CROSS REFERENCE TO RELATED APPLICATION

This application is a continuation application of PCT/JP2018/000811 filed on Jan. 15, 2018 and claims benefit of Japanese Application No. 2017-034594 filed in Japan on Feb. 27, 2017, the entire contents of which are incorporated herein by this reference.

BACKGROUND OF INVENTION

1. Field of the Invention

The present invention relates to an image processing apparatus that subjects a color video signal to white balance correction, an image processing method, and a recording medium.

2. Description of the Related Art

While an analog signal can continuously change in signal value, a digital signal changes in a predetermined quantization unit. Accordingly, RAW image data obtained by digitizing an analog image signal includes a quantization error.

Image processing to be performed for the RAW image data generally includes white balance correction processing for multiplying the RAW image data by a white balance gain that differs for each of color signals. However, when the RAW image data including the quantization error is multiplied by the white balance gain, the error to be enlarged may become visible as a false color a color balance among the color signals of which is disrupted because the error differs in magnitude for each of the color signals.

The false color is particularly noticeable in an achromatic color portion. Japanese Patent Application Laid-Open Publication No. 2015-207825 describes a technique for reducing a false color in an achromatic color portion.

Examples of a recent image pickup apparatus include an image pickup apparatus having a high-speed reading mode capable of reading out image pickup data at high speed as an image pickup driving mode. The image pickup apparatus is used when high-speed consecutive shooting is performed or when movie shooting at a high-speed frame rate with a smooth motion is performed, for example. The high-speed reading mode is a reading mode in which a reading time period is shortened by keeping a number of bits in A/D conversion lower than a number of bits in A/D conversion in a normal reading mode.

SUMMARY OF THE INVENTION

An image processing apparatus according to an aspect of the present invention is an image processing apparatus for processing a color video signal, the image processing apparatus including a processor including hardware, the processor being configured to: extend an N-bit color video signal before white balance correction to an M-bit color video signal satisfying M>N; subject the M-bit color video signal obtained by the extension to level correction based on (M−N); and subject the color video signal subjected to the level correction to the white balance correction.

An image processing method according to another aspect of the present invention is an image processing method for processing a color video signal, the method including: extending an N-bit color video signal before white balance correction to an M-bit color video signal satisfying M>N; subjecting the M-bit color video signal obtained by the extension to level correction based on (M−N); and subjecting the color video signal subjected to the level correction to the white balance correction.

A recording medium according to yet another aspect of the present invention is a computer readable recording medium recording an image processing program for causing a computer to process a color video signal, the image processing program causing the computer to extend an N-bit color video signal before white balance correction to an M-bit color video signal satisfying M>N, subject the M-bit color video signal obtained by the extension to level correction based on (M−N), and subject the color video signal subjected to the level correction to the white balance correction.

DETAILED DESCRIPTION OF THE PREFERRED EMBODIMENTS

An embodiment of the present invention will be described below with reference to the drawings.

First Embodiment

Figure 1:
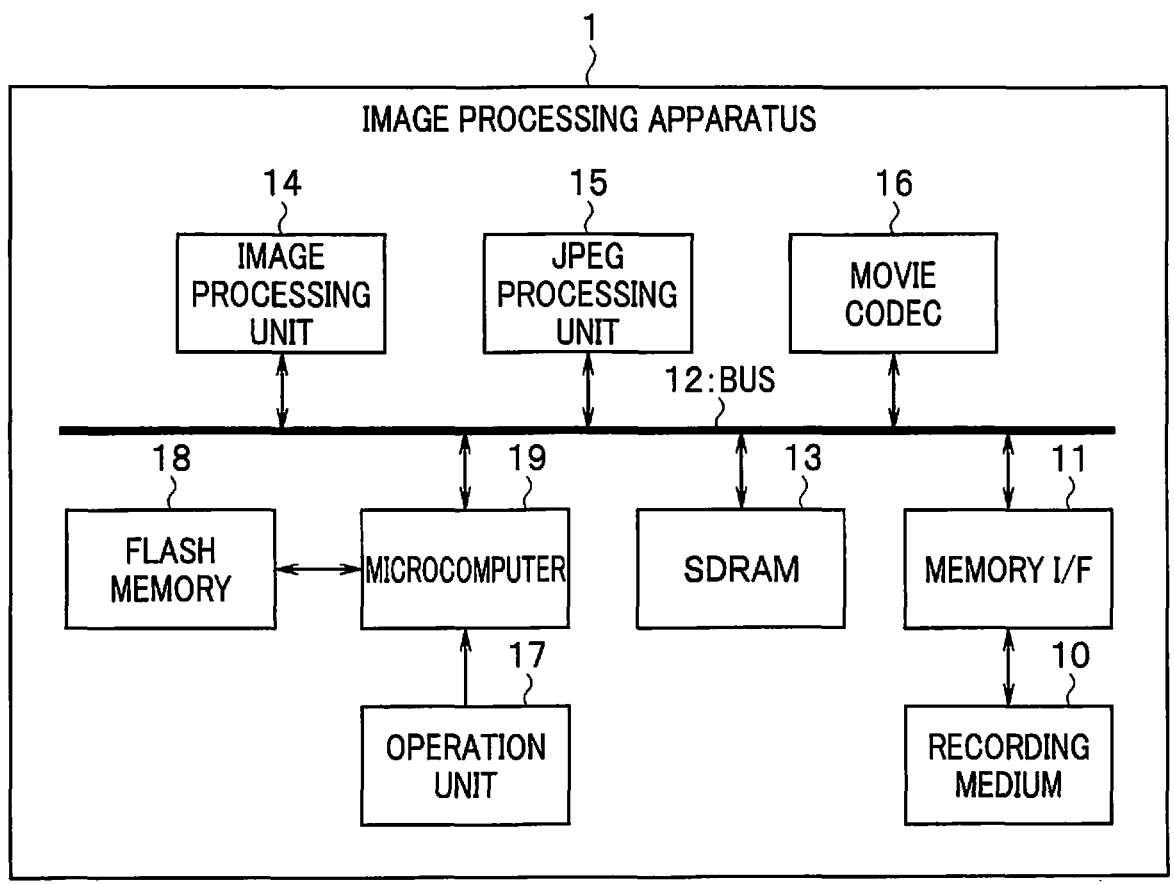
FIG. 1 is a block diagram illustrating a configuration of an image processing apparatus according to a first embodiment of the present invention.

FIGS. 1 to 9 illustrate a first embodiment of the present invention, where FIG. 1 is a block diagram illustrating a configuration of an image processing apparatus 1.

As illustrated in FIG. 1, the image processing apparatus 1 is for processing a digital color video signal (hereinafter merely referred to as a color video signal or image data), and includes a recording medium 10, a memory interface (memory I/F) 11, a bus 12, an SDRAM 13, an image processing unit 14, a JPEG processing unit 15, a movie codec 16, an operation unit 17, a flash memory 18, and a microcomputer 19.

The recording medium 10 is a recording unit including a memory card detachably attached to the image processing apparatus 1, for example, and storing image data (movie data, a still image data, etc.) in a nonvolatile manner. Therefore, the recording medium 10 need not have a configuration specific to the image processing apparatus 1.

Although the image processing apparatus 1 is described as inputting image data via the recording medium 10, for example, in the present embodiment, the present invention is not limited to this. The image processing apparatus 1 may be configured to input image data via a communication line or the like, or may be configured to process image data acquired by an image pickup apparatus performing image pickup when the image processing apparatus 1 is incorporated into the image pickup apparatus.

The image data is a digital color image signal, that is, so-called RAW image data obtained by performing photoelectric conversion and further A/D conversion for an optical image of an object formed by a lens using a color image pickup device including a color filter in a primary color Bayer array, for example.

At this time, the image pickup device can operate in a normal reading mode and a high-speed reading mode, for example. The normal reading mode is used when still image shooting is performed, for example. The high-speed reading mode is used when high-speed continuous shooting is performed or when movie shooting at a high-speed frame rate with a smooth motion is performed, for example. The high-speed reading mode is a reading mode in which a reading time period is shortened by keeping a number of bits in A/D conversion lower than a number of bits in A/D conversion in the normal reading mode. In other words, M-bit A/D conversion, for example, is performed at the time of normal reading, and N-bit A/D conversion is performed at the time of high-speed reading. M and N are respectively positive integers satisfying M>N. An example of specific numerical values is M=10 and N=8.

The memory I/F 11 is a reading control unit configured to perform control to read out image data recorded on the recording medium 10 and is further a recording control unit configured to perform control to record image data after image processing on the recording medium 10.

The bus 12 is a transfer path for transferring various types of data and a control signal from a place to another place within the image processing apparatus 1. The bus 12 in the present embodiment is connected to the memory I/F 11, the SDRAM 13, the image processing unit 14, the JPEG processing unit 15, the movie codec 16, and the microcomputer 19.

The image data, which has been read out from the recording medium 10 by the memory I/F 11, is transferred via the bus 12, and is stored once in the SDRAM 13.

The SDRAM 13 is a storage unit configured to temporarily store various types of data such as image data read out from the recording medium 10, image data processed or being processed by the image processing unit 14, and image data processed or being processed by the movie codec 16.

The image processing unit 14 performs various types of image processing for the image data, and generates an image for display or recording.

The JPEG processing unit 15 is a compression/decompression unit configured to compress or decompress still image data using JPEG processing. The still image data processed by the JPEG processing unit 15 is recorded as a JPEG file on the recording medium 10 via the memory I/F 11 after a header or the like is added to the still image data by the microcomputer 19.

The movie codec 16 compresses and decompresses movie data using an appropriate processing method such as Motion JPEG or MPEG. The movie data processed by the movie codec 16 is recorded as a movie file on the recording medium 10 via the memory I/F 11 after a header or the like is added to the movie data by the microcomputer 19.

The operation unit 17 is used for performing various types of operation inputs for the image processing apparatus 1, and can operate ON/OFF of power to the image processing apparatus 1, start/end of image processing, setting of various types of parameters in image processing, and reading and storage of an image file from and in the recording medium 10, for example. When an operation is performed for the operation unit 17, a signal corresponding to an operation content is outputted to the microcomputer 19.

The flash memory 18 is a storage medium configured to store a processing program executed by the microcomputer 19 (including an image processing program as a program for performing an image processing method by the image processing apparatus 1) and various types of information about the image processing apparatus 1 in a nonvolatile manner. An example of the information stored in the flash memory 18 includes a parameter, a table, a function, or a setting value set by a user to be used for image processing. More specifically, the flash memory 18 stores a white balance gain corresponding to a type of light source (e.g., sun in daytime, sun in morning or evening, a bulb, or a fluorescent lamp). The information stored in the flash memory 18 is read by the microcomputer 19.

The microcomputer 19 is a control unit configured to integrally control the image processing apparatus 1. When the microcomputer 19 receives an operation input by the user from the operation unit 17, the microcomputer 19 reads a parameter or the like required for processing from the flash memory 18 according to a processing program stored in the flash memory 18, to perform various types of sequences corresponding to an operation content.

When a target image is selected, to start to perform image processing, for example, image data is read out via the memory I/F 11 from the recording medium 10 based on control by the microcomputer 19, and is stored in the SDRAM 13 via the bus 12. Further, the image processing unit 14 performs image processing based on the control by the microcomputer 19 so that the image data after the image processing is stored again in the SDRAM 13. The image data after the image processing is displayed on a display unit such as a monitor. The user can also perform image processing again by seeing an image displayed on the monitor to change a setting value of a processing parameter, if necessary. The image data is subjected to JPEG compression by the JPEG processing unit 15 when the image data is still image data, or is subjected to movie compression by the movie codec 16 when the image data is movie data, and is recorded as an image file on the recording medium 10.

Note that the image processing apparatus 1 may be configured as a dedicated processing apparatus, or may be configured to cause a computer to execute an image processing program. Alternatively, the image processing apparatus 1 may be incorporated into the image pickup apparatus.

Figure 2:
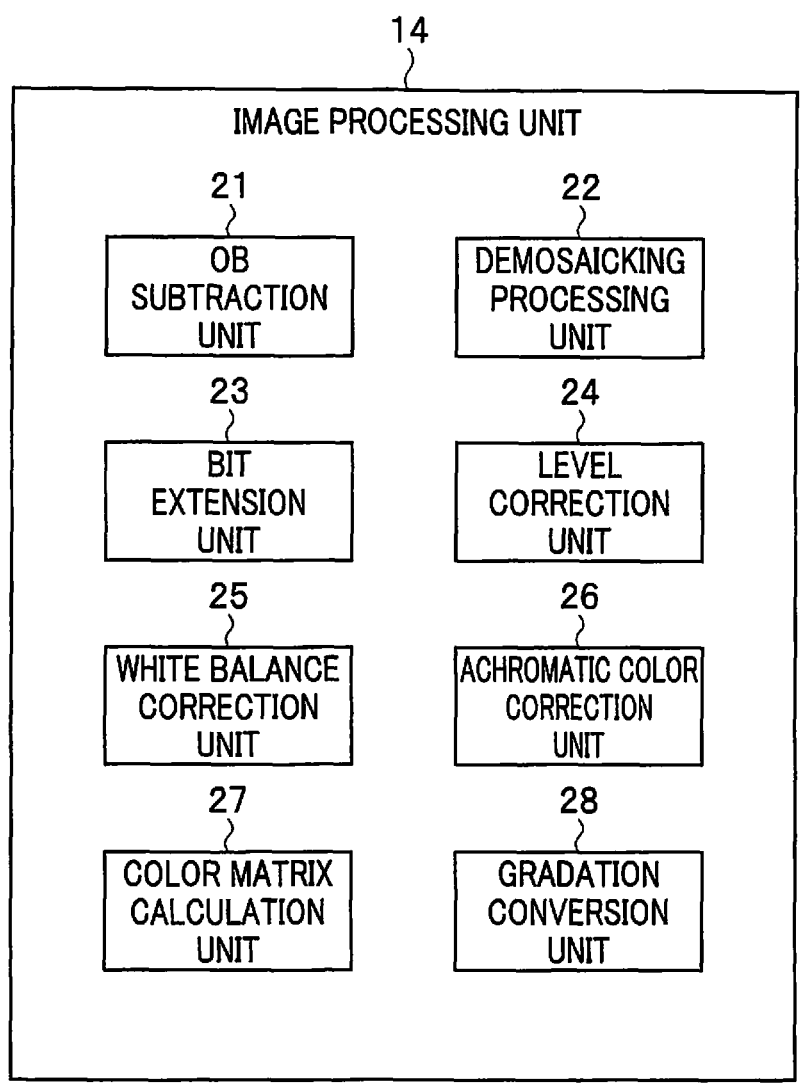
FIG. 2 is a block diagram illustrating a configuration of an image processing unit in the first embodiment.
Figure 3:
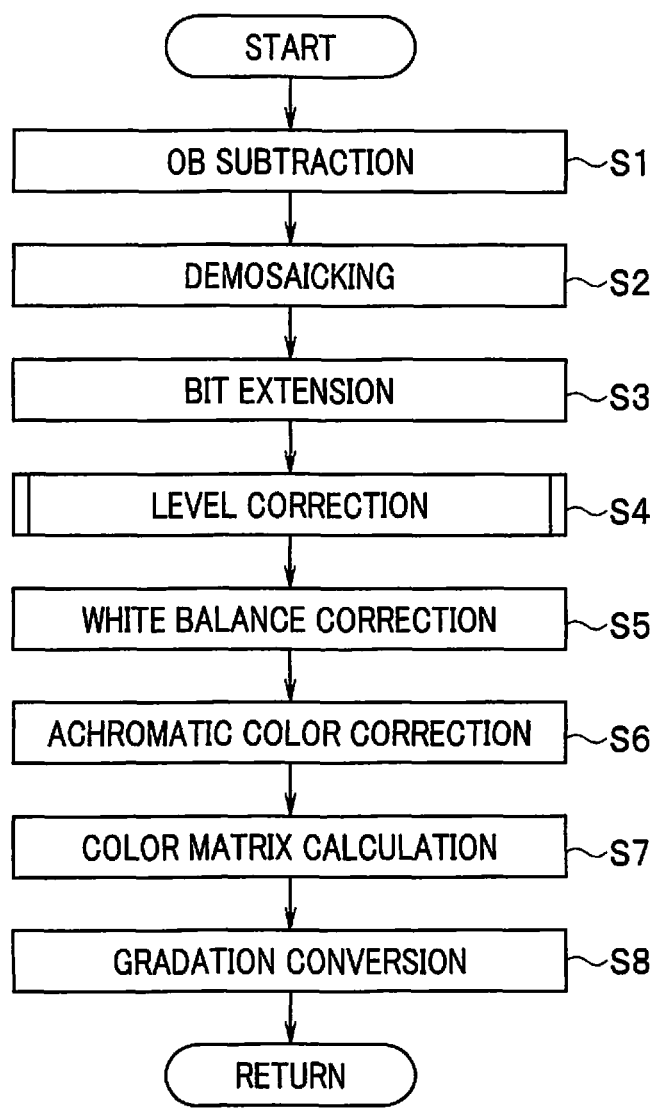
FIG. 3 is a flowchart illustrating a function of the image processing unit in the first embodiment.

Then, FIG. 2 is a block diagram illustrating a configuration of the image processing unit 14, and FIG. 3 is a flowchart illustrating a function of the image processing unit 14.

As illustrated in FIG. 2, the image processing unit 14 includes an OB subtraction unit 21, a demosaicking processing unit 22, a bit extension unit 23, a level correction unit 24, a white balance correction unit 25, an achromatic color correction unit 26, a color matrix calculation unit 27, and a gradation conversion unit 28. Note that, the image processing unit 14 is supposed to be configured to perform functions of the respective units in the image processing unit 14 by causing a processor including hardware such as CPU to execute software. However, the image processing unit 14 is not limited to such a configuration, but may be configured by a processor including electronic circuits (hardware) corresponding to the respective units in the image processing unit 14.

When processing illustrated in FIG. 3 is started from main processing (not illustrated) in the image processing apparatus 1, the OB subtraction unit 21 subtracts, when image data contains an OB (optical black) component, the OB component from the image data (step S1). Therefore, the image data containing the OB component is read out from the recording medium 10 by the memory I/F 11 because the OB component is also recorded on the recording medium 10.

The demosaicking processing unit 22 performs demosaicking processing (step S2). In other words, the demosaicking processing unit 22 interpolates, in an RGB Bayer image composed of pixels each including a color signal having one color, the missing color signal in the pixel based on the color signal having the same color as the color of the missing color signal in the pixel in the vicinity of the pixel including the missing color signal, to generate an image in which the color signal having each of RGB colors exists for each of the pixels.

The bit extension unit 23 extends an N-bit color video signal that has not yet been subjected to white balance correction to an M-bit color video signal satisfying M>N (step S3). Therefore, the bit extension unit 23 does not perform special processing when a number of bits composing image data is M.

In the image processing unit 14, the units arranged in stages preceding the bit extension unit 23, specifically the OB subtraction unit 21 and the demosaicking processing unit 22 in a processing order illustrated in FIG. 3, are configured such that inputted image data can be processed even when composed of either N bits or M bits.

On the other hand, in the image processing unit 14, the units arranged in stages succeeding the bit extension unit 23, specifically the level correction unit 24, the white balance correction unit 25, the achromatic color correction unit 26, the color matrix calculation unit 27, and the gradation conversion unit 28 in the processing order illustrated in FIG. 3, are configured to process M-bit image data.

Therefore, the bit extension unit 23 extends, when the number of bits composing the inputted image data is less than M (more specifically, N), the bits to M bits to match processing bits in the succeeding stages.

Although an example in which the reading mode for the image pickup device is the normal reading mode or the high-speed reading mode has been described as an example of a reason why the number of bits composing the image data to be inputted to the image processing unit is M or N, the present invention is not limited to this. The reason may be that a plurality of image data have been respectively acquired by different image pickup apparatuses, that is, first image data has been acquired by a first image pickup apparatus that outputs M-bit image data and second image data has been acquired by a second image pickup apparatus that outputs N-bit image data.

The level correction unit 24 subjects the M-bit color video signal obtained by the extension by the bit extension unit 23 to level correction based on (M−N) (step S4). The level correction unit 24 calculates a level correction width W, for example, by a following equation when a power is represented by a symbol "^" (the same applies hereinafter):

$$W = \{2^{\wedge}(M-N)\} - 1, \text{ and}$$

subjects the color video signal to level correction in a range defined by the level correction width W (i.e., a range of a quantization error occurring by bit extension).

More specifically, the level correction unit 24 subjects the color video signal to level correction in a following range when the color video signal that has not yet been subjected to level correction is represented by Lm and the color video signal that has been subjected to level correction is represented by Lc:

$$Lm < Lc \leq Lm + W.$$

When a signal value of the color video signal is multiplied by a value $\{2^{\wedge}(M-N)\}$ to perform bit extension, the correction range is appropriate.

If bit extension in which the number of bits increases by (M−N) is performed using any other method, a correction range is not limited to this. The color video signal may be subjected to level correction, for example, in a following range (even in the cases, the range defined by the level correction width W is maintained):

$$\{Lm - (W/2)\} < Lc \leq \{Lm + (W/2)\}, \text{ or}$$

$$(Lm - W) < Lc \leq Lm.$$

In the present embodiment, a case where the color video signal is an R signal, a G signal, and a B signal is assumed. The level correction unit 24 does not subject the G signal to level correction but subjects the R signal and the B signal to level correction, as described below. This is for changing a color balance but not changing a luminance by level correction because the G signal is a luminance equivalent signal.

The white balance correction unit 25 subjects the color video signal that has been subjected to level correction by the level correction unit 24 to white balance correction (step S5). The white balance correction is color balance correction for making a white object also appear white on an image.

Since the G signal is the luminance equivalent signal, as described above, it is preferable to change a white balance but not change a luminance by white balance correction. The white balance correction unit 25 does not cause a signal value change by white balance correction in the G signal (does not multiply the G signal by a gain or set a gain by which the G signal is to be multiplied to one), but can cause the signal value change in the R signal and the B signal (multiplies the R signal by a white balance gain Rgain corresponding to the R signal and multiplies the B signal by a white balance gain Bgain corresponding to the B signal).

The white balance gain corresponding to the type of light source, as described above, is read out from the flash memory 18 by the microcomputer 19, and is transmitted to the level correction unit 24 and the white balance correction unit 25. On the other hand, if the white balance correction unit 25 adaptively determines a white balance gain based on image data, the white balance gain determined by the white balance correction unit 25 is transmitted to the level correction unit 24 from the white balance correction unit 25 before the white balance correction unit 25 performs white balance correction. In either case, the level correction unit 24 acquires the white balance gain before the white balance correction unit 25 performs white balance correction.

The achromatic color correction unit 26 performs processing for reducing a false color occurring in an achromatic color portion of an image based on a technique described in Japanese Patent Application Laid-Open Publication No. 2015-207825, described above, for example (step S6). In other words, in the present embodiment, a false color occurring in a chromatic color portion (the processing is not limited to the chromatic color portion, as described below) of the image is reduced by the processing of the level correction unit 24, and the false color occurring in the achromatic color portion of the image is reduced by the processing of the achromatic color correction unit 26.

The color matrix calculation unit 27 configures an RGB signal of each of pixel data composing image data as a matrix of three rows and one column (or a matrix of one row and three columns), for example, and performs processing for calculating a color matrix of three rows and three columns for the pixel data to convert a color space (step S7). Color matrix coefficients composing the color matrix of three rows and three columns are previously recorded in the flash memory 18, for example.

The gradation conversion unit 28 converts a gradation of the image using such a gradation conversion characteristic (e.g., a gamma conversion characteristic) that gradation display on the monitor becomes appropriate (step S8).

Then, the processing returns to the main processing not illustrated of the image processing apparatus 1.

Note that since the processing order within the image processing unit 14 illustrated in FIG. 3 is an example, processing may be performed in another processing order within a reasonable range, as such as an order of performing the bit extension in step S3, the level correction in step S4, and the white balance correction in step S5 is maintained.

Figure 4:
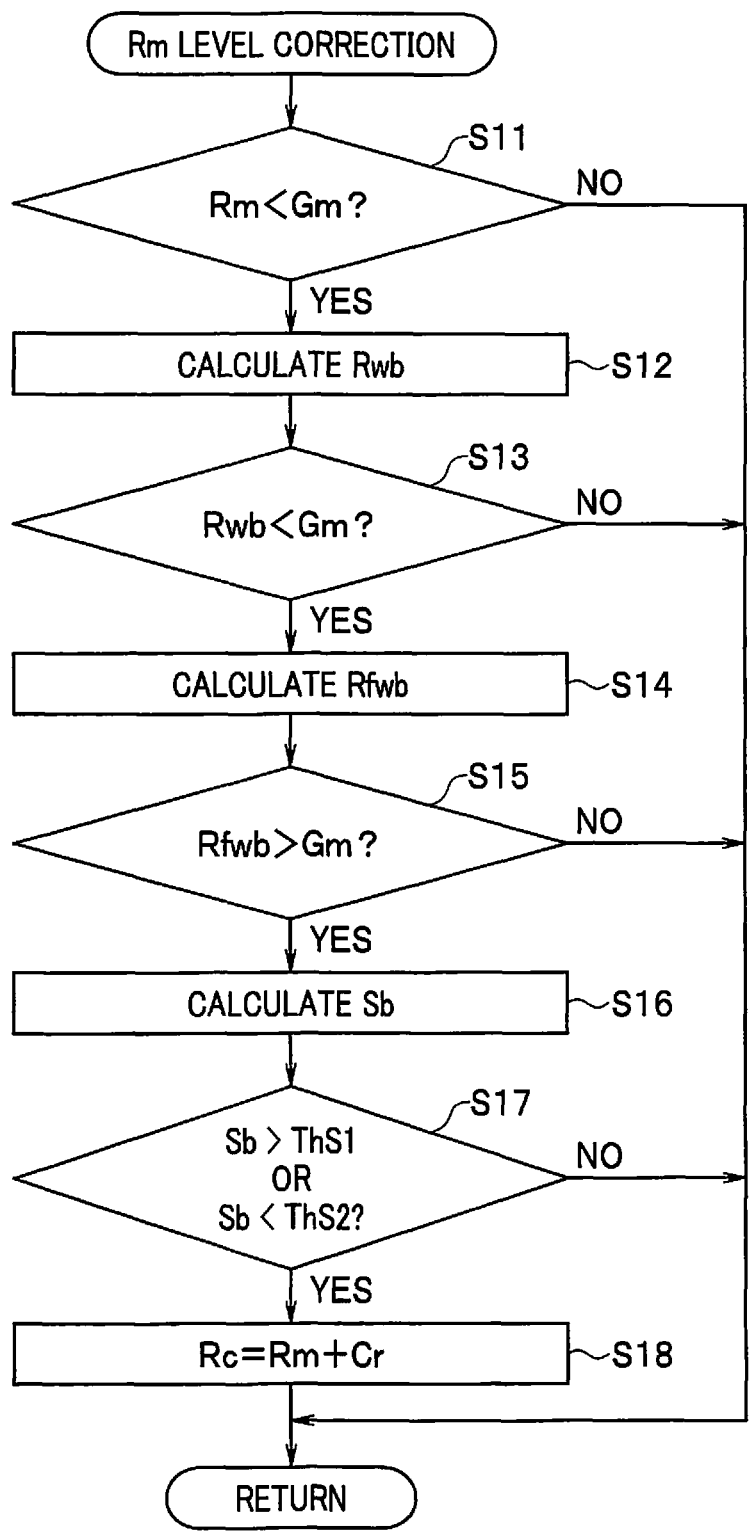
FIG. 4 is a flowchart illustrating Rm level correction in the first embodiment.

Then, FIG. 4 is a flowchart illustrating Rm level correction. When level correction processing is started in step S4 illustrated in FIG. 3, the level correction unit 24 performs for each pixel processing for the Rm level correction illustrated in FIG. 4 for the R signal, and performs for each pixel processing for Bm level correction illustrated in FIG. 5, described below, for the B signal.

Rm and Bm respectively represent the R and B signals that have not yet been subjected to level correction. The R and B signals that have been subjected to level correction are respectively represented as Rc and Bc in following description.

When the processing illustrated in FIG. 4 is started, it is judged whether or not Rm<Gm is satisfied (step S11).

If it is judged that Rm<Gm is satisfied, the R signal Rm is multiplied by the white balance gain Rgain corresponding to the R signal, to calculate an R signal Rwb obtained by performing white balance correction without performing level correction, as follows (step S12):

$$Rwb = Rm \times Rgain.$$

It is judged whether or not Rwb<Gm is satisfied (step S13).

Figure 8:
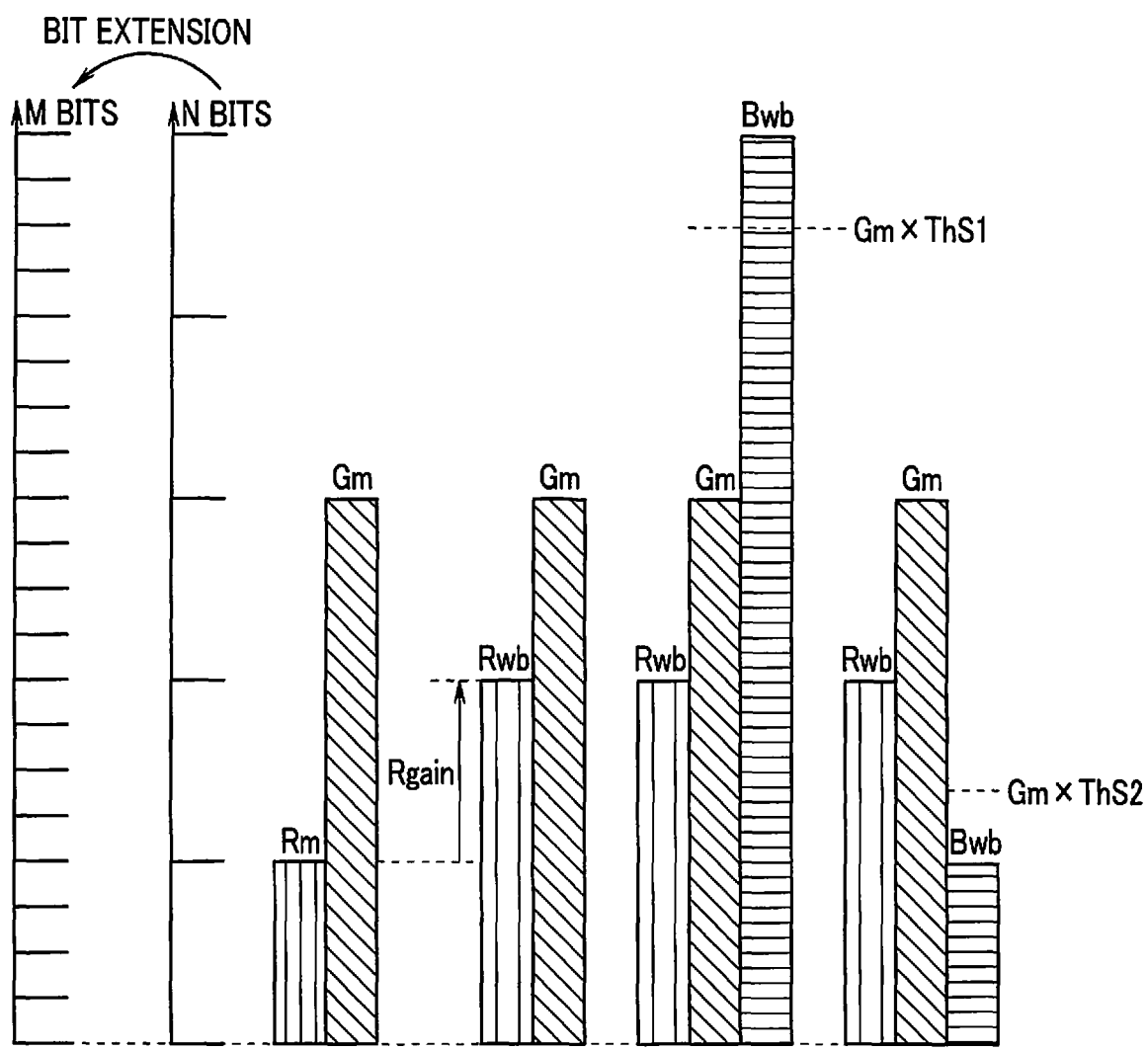
FIG. 8 is a graph illustrating an example of an R signal Rwb, a G signal Gm, and a B signal Bwb obtained by performing white balance correction without performing level correction, together with a state of bit extension.

FIG. 8 is a graph illustrating an example of the R signal Rwb, a G signal Gm, and a B signal Bwb obtained by performing white balance correction without performing level correction, together with a state of bit extension. FIG. 8 illustrates an example in which Rwb<Gm is satisfied.

If it is judged that Rwb<Gm is satisfied, the level correction width W is calculated by a following equation:

$$W = \{2^{(M-N)}\} - 1.$$

When the R signal that has been subjected to level correction is represented by Rc, the R signal is subjected to level correction in a following range defined by the level correction width W:

$$Rm < Rc \leq Rm + W.$$

A maximum level correction value Rf of the R signal is calculated by a following equation:

$$Rf = Rm + W.$$

Further, the maximum level correction value Rf is multiplied by the white balance gain Rgain corresponding to the R signal, to calculate an R signal Rfwb obtained by performing maximum level correction, as follows (step S14):

$$Rfwb = Rf \times Rgain$$

Then, it is judged whether or not Rfwb>Gm is satisfied (step S15). A condition that all steps S11, S13, and S15 are satisfied, that is, a condition that a following condition is satisfied is a first condition:

$$Rm < Gm \text{ and } Rwb < Gm \text{ and } Rfwb > Gm.$$

Figure 9:
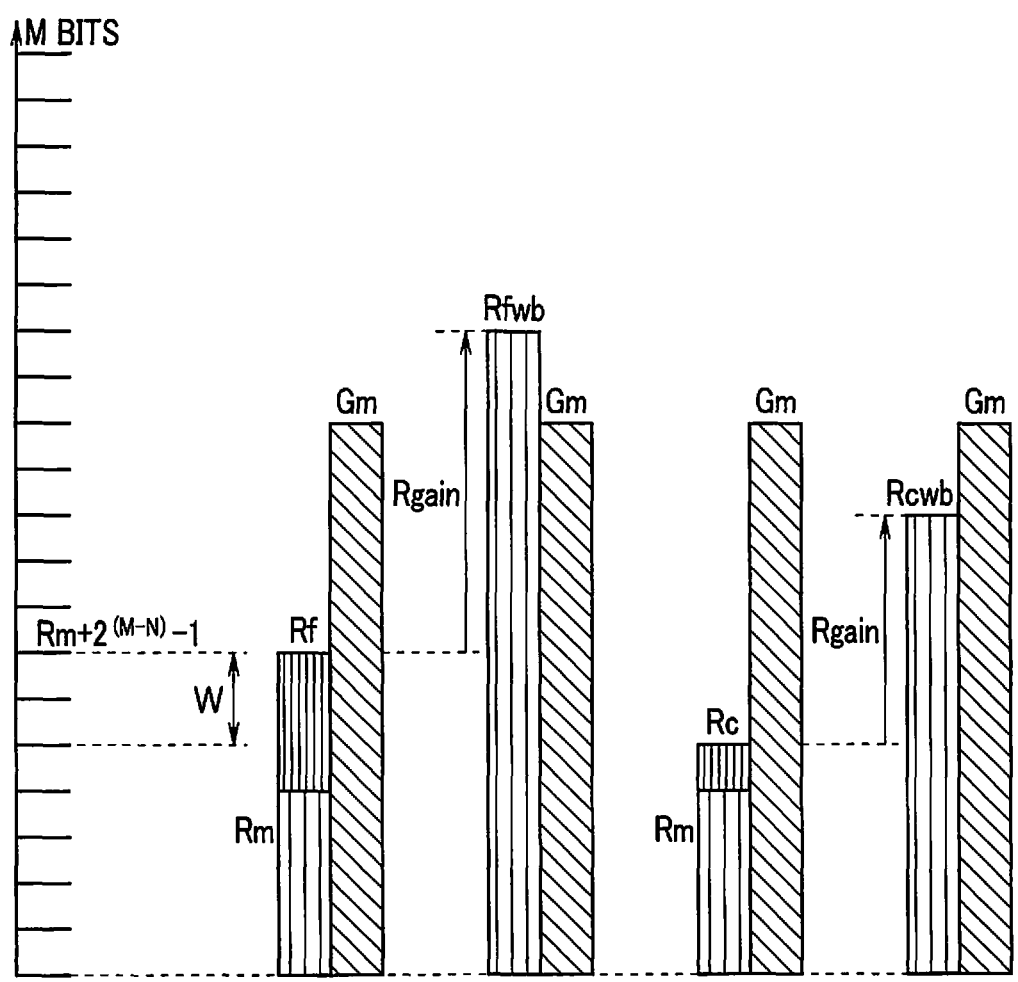
FIG. 9 is a graph illustrating an example in which a maximum level correction value Rf of an R signal and an R signal Rc obtained by performing level correction have been subjected to white balance correction in the first embodiment.

FIG. 9 is a graph illustrating an example in which the maximum level correction value Rf of the R signal and the R signal Rc after the level correction have been subjected to white balance correction. FIGS. 8 and 9 illustrate an example in which the first condition is satisfied.

If it is judged that Rfwb>Gm is satisfied, the R signal Rwb obtained by subjecting the R signal Rm to white balance correction as it is remains less than the G signal Gm (see FIG. 8). However, this means that the R signal Rfwb obtained by performing maximum level correction and then white balance correction for the R signal Rm is larger than the G signal Gm (see FIG. 9). That is, it means that a magnitude relationship between the R signal Rm and the G signal Gm after the white balance correction can be reversed by level correction (therefore, Rm and Gm are originally values not far away from each other).

In the processing illustrated in FIG. 4, if it is judged that Rfwb>Gm is satisfied, it is further judged whether or not a pixel to be processed has a chromatic color.

In other words, in association with the Rm level correction, as an index indicating whether or not the pixel has a chromatic color (a saturation in a broad sense), for example, a saturation Sb relating to B is calculated by the following equation (step S16).

$$Sb = Bwb/Gm$$

It is judged whether or not Sb>ThS1 (satisfying ThS1>1.0) as a judgment that the saturation Sb relating to B is higher than a first threshold value, and it is judged whether or not Sb<ThS2 (satisfying ThS2<1.0) as a judgment that a saturation relating to a complementary color of B is higher than a second threshold value (step S17).

FIG. 8 illustrates an example in which Sb>ThS1 (i.e., Bwb>{Gm×ThS1}) is satisfied and an example in which Sb<ThS2 (i.e., Bwb<{Gm×ThS2}) is satisfied.

If it is judged that either one of Sb>ThS1 and Sb<ThS2 is satisfied, a level correction amount Cr is set in a following range:

$$0 < Cr \leq W, \text{ and}$$

an R signal Rc obtained by performing level correction is calculated by the following equation (step S18).

$$Rc = Rm + Cr$$

Although the R signal Rc can be set as desired in a following range, described above, an example in which a central value within the range is set as Rc is cited as a specific value.

$$Rm < Rc \leq Rm + W$$

Since W takes an odd value such as 1, 3, 7, 15, . . . depending on (M−N)=1, 2, 3, 4, . . . , a half of the value of W is a half odd value. One of integer values adjacent to the central value is cited as a more specific example as follows.

$$Rc = Rm + [\{2^{\wedge}(M-N)\} - 1 + 1]/2$$
$$= Rm + \{2^{\wedge}\{M-N-1\}\}$$

In this example, following level correction is performed depending on a change in the number of bits (M−N)=1, 2, 3, 4, . . . occurring when bit extension has been performed.

$$Rc=(Rm+1),(Rm+2),(Rm+4),(Rm+8), \ldots$$

Processing in step S18 is performed, or processing returns to the processing illustrated in FIG. 3 if the condition in any one of steps S11, S13, S15, and S17 is not satisfied.

If the processing in step S18 has been performed, the R signal Rc after the level correction is multiplied by the white balance gain Rgain by the processing in subsequent step S5, to calculate Rcwb as an R signal obtained by performing level correction and then white balance correction, as illustrated in FIG. 9. On the other hand, if the processing in step S18 has not been performed, the R signal Rm is multiplied by the white balance gain Rgain in white balance correction, to calculate an R signal Rwb.

Figure 5:
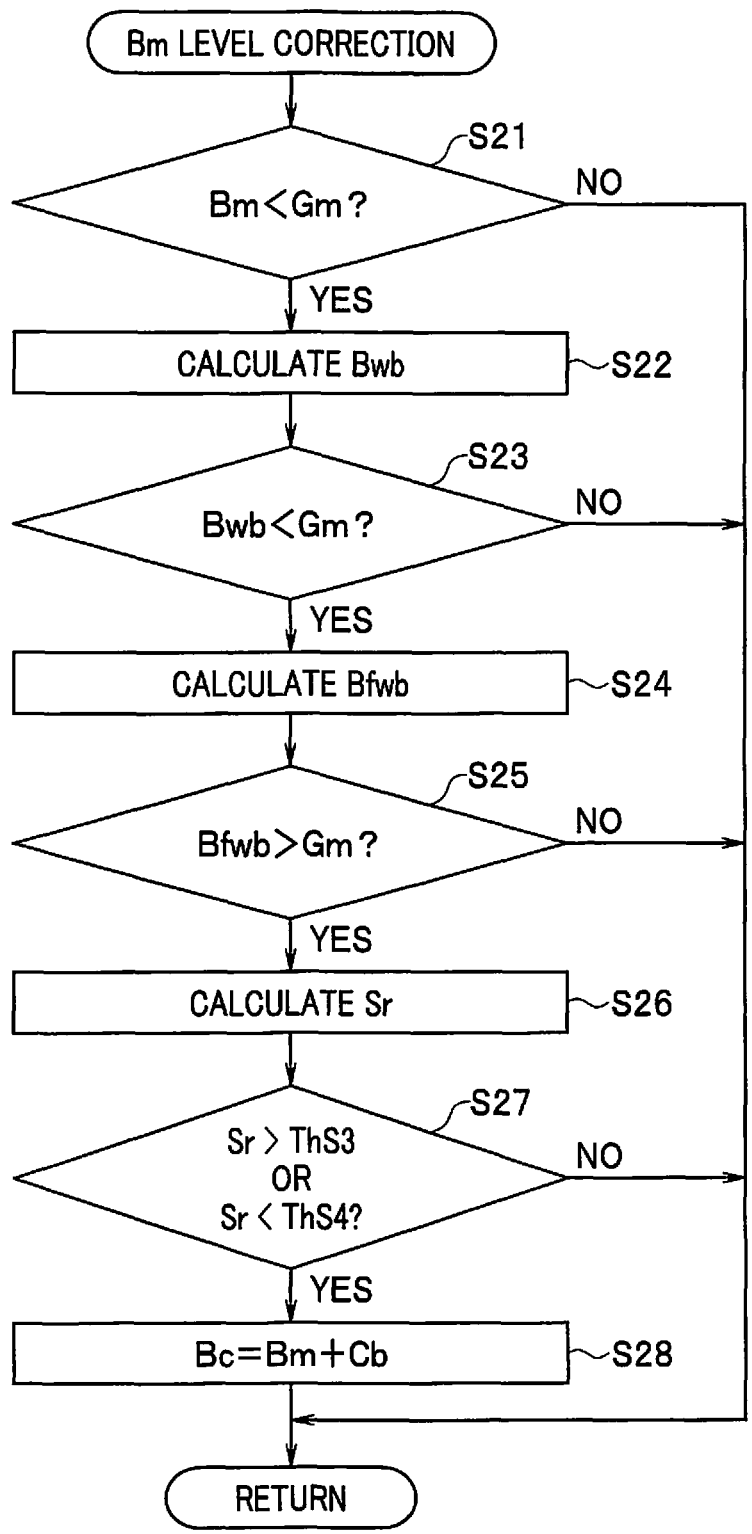
FIG. 5 is a flowchart illustrating Bm level correction in the first embodiment.

Then, FIG. 5 is a flowchart illustrating the Bm level correction. When the level correction processing is started in step S4 illustrated in FIG. 3, as described above, the level correction unit 24 performs for each pixel the processing for the Bm level correction illustrated in FIG. 5 for the B signal. The processing for the Bm level correction illustrated in FIG. 5 is substantially similar to the processing for the Rm level correction illustrated in FIG. 4, described above, except that a signal to be processed is changed from the R signal to the B signal.

In other words, when the processing illustrated in FIG. 5 is started, it is first judged whether or not Bm<Gm is satisfied (step S21).

If it is judged that Bm<Gm is satisfied, the B signal Bm is multiplied by the white balance gain Bgain corresponding to the B signal, to calculate the B signal Bwb obtained by performing white balance correction without performing level correction, as follows (step S22).

$$Bwb=Bm \times Bgain$$

It is judged whether or not Bwb<Gm is satisfied (step S23).

If it is judged that Bwb<Gm is satisfied, the B signal is subjected to level correction in a following range: Bm<Bc≤Bm+W, defined by the above-described level correction width W, to calculate the B signal Bc after the level correction.

A maximum level correction value Bf of the B signal is calculated as follows:

$$Bf=Bm+W.$$

Further, the maximum level correction value Bf is multiplied by the white balance gain Bgain corresponding to the B signal, to calculate a B signal Bfwb obtained by performing maximum level correction, as follows (step S24).

$$Bfwb=Bf \times Bgain$$

Then, it is judged whether or not Bfwb>Gm is satisfied (step S25). A condition that all steps S21, S23, and S25 are satisfied, that is, a condition that a following condition is satisfied is a second condition.

$$Bm<Gm \text{ and } Bwb<Gm \text{ and } Bfwb>Gm$$

If it is judged that Bfwb>Gm is satisfied, the B signal Bwb obtained by subjecting the B signal Bm to white balance correction as it is remains less than the G signal Gm. However, this means that the B signal Bfwb obtained by performing maximum level correction and then white balance correction for the B signal Bm is larger than the G signal Gm, that is, it means that a magnitude relationship between the B signal Bm and the G signal Gm after the white balance correction can be reversed by level correction (therefore, Bm and Gm are originally values not far away from each other).

In the processing illustrated in FIG. 5, if it is judged that Bfwb>Gm is satisfied, it is further judged whether or not a pixel to be processed has a chromatic color.

In other words, in association with the Rm level correction, as an index indicating whether or not the pixel has a chromatic color (a saturation in a broad sense), for example, a saturation Sb relating to B is calculated by the following equation (step S26):

$$Sr=Rwb/Gm$$

It is judged whether or not Sr>ThS3 (satisfying ThS3>1.0) as a judgment that the saturation Sr relating to R is higher than a third threshold value, and it is judged whether or not Sr<ThS4 (satisfying ThS4<1.0) as a judgment that a saturation relating to a complementary color of R is higher than a fourth threshold value (step S27).

If it is judged that either one of Sr>ThS3 and Sr<ThS4 is satisfied, a level correction amount Cb is set in a following range:

$$0<Cb \leq W, \text{ and}$$

a B signal Bc obtained by performing level correction is calculated by the following equation (step S28).

$$Bc=Bm+Cb$$

A following integer value closest to a central value within a range is cited as an example of a specific value of the B signal Bc, like in the above-described case of the R signal Rc:

$$Bc=Bm+\{2^{\wedge}(M-N-1)\}.$$

Processing in step S28 is performed, or processing returns to the processing illustrated in FIG. 3 if the condition in any one of steps S21, S23, S25, and S27 is not satisfied.

If the processing in step S28 has been performed, the B signal Bc after the level correction is multiplied by the white balance gain Bgain by the processing in subsequent step S5, to calculate Bcwb as a B signal obtained by performing level correction and then white balance correction. On the other hand, if the processing in step S28 has not been performed, the B signal Bm is multiplied by the white balance gain Bgain in white balance correction, to calculate a B signal Bwb.

Thus, the level correction unit 24 calculates for each pixel the saturation based on the R signal Rwb, the G signal Gm, and the B signal Bwb obtained by performing white balance correction without performing level correction, to further judge whether or not the saturation satisfies a third condition higher than a predetermined threshold value, calculates the R signal Rc only when the saturation satisfies the first condition and the third condition, and calculates the B signal Bc only when the saturation satisfies the second condition and the third condition, as described in steps S16 and S17 illustrated in FIG. 4 and steps S26 and S27 illustrated in FIG. 5.

More specifically, the level correction unit 24 judges whether or not the saturation Sb relating to B is higher than the first threshold value or the saturation relating to a complementary color of B is higher than the second threshold value as a judgment whether or not the saturation satisfies the third condition relating to calculation of the R signal Rc, and judges whether or not the saturation Sr relating to R is higher than the third threshold value or the saturation relating to a complementary color of R is higher than the fourth threshold value as a judgment whether or not the saturation satisfies the third condition relating to calculation of the B signal Bc.

In the processing illustrated in FIGS. 4 and 5, it is judged whether or not the third condition relating to the saturation is satisfied, as described above (see steps S16 to S17 and steps S26 to S27), and the level correction unit 24 performs level correction only when the third condition is satisfied.

However, the present invention is not limited to this.

Figure 6:
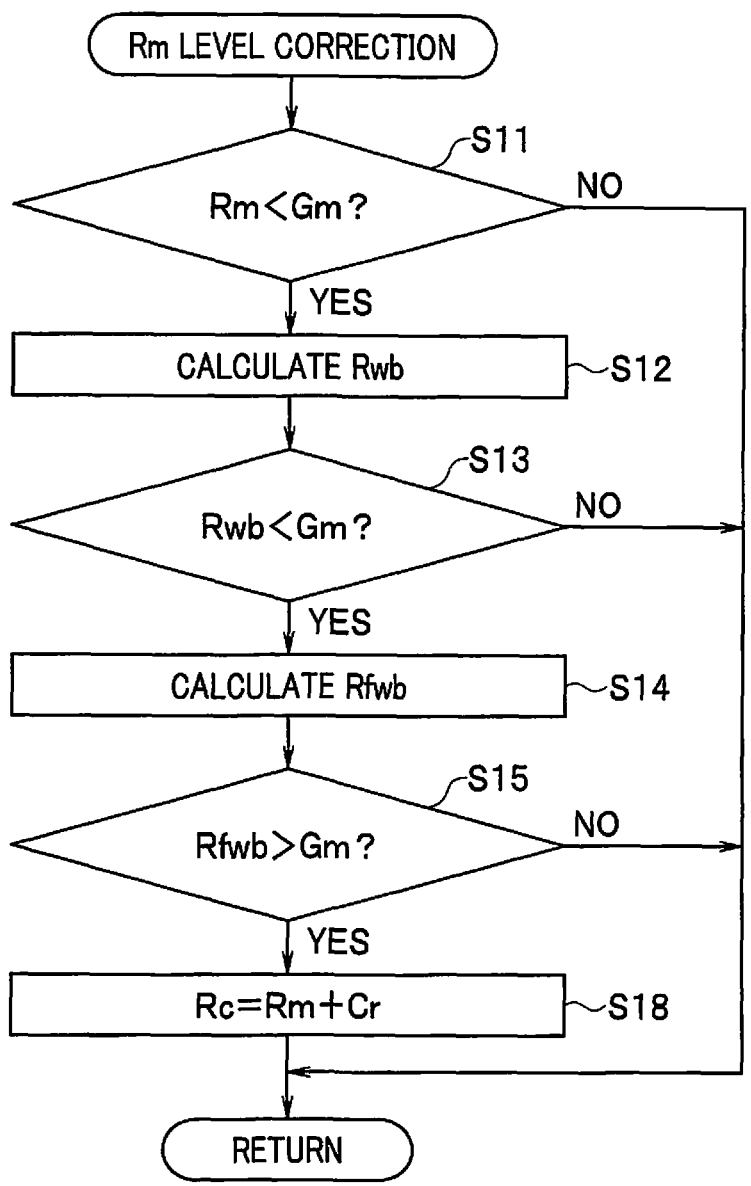
FIG. 6 is a flowchart illustrating a modification of the Rm level correction in the first embodiment.
Figure 7:
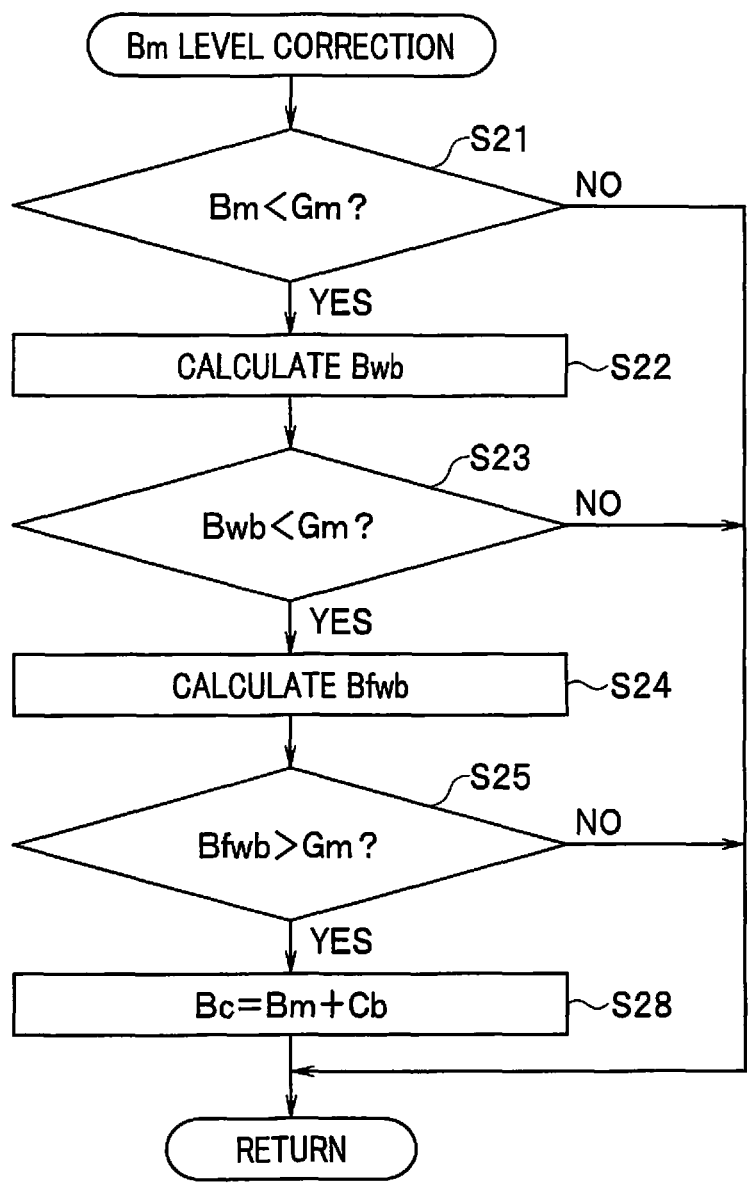
FIG. 7 is a flowchart illustrating a modification of the Bm level correction in the first embodiment.

FIG. 6 is a flowchart illustrating a modification of the Rm level correction, and FIG. 7 is a flowchart illustrating a modification of the Bm level correction.

Processing illustrated in FIG. 6 is obtained by omitting processes in steps S16 and S17 from the processing illustrated in FIG. 4, and processing illustrated in FIG. 7 is obtained by omitting processes in steps S26 and S27 from the processing illustrated in FIG. 5. Accordingly, the judgment whether or not the saturation satisfies the third condition may be omitted.

In either the processing illustrated in FIGS. 4 and 5 or the processing illustrated in FIGS. 6 and 7, processes in steps S11, S13, and S15 and processes in steps S21, S23, and S25 are performed. Thus, the level correction unit 24 judges whether or not a pixel satisfies a following first condition, described above, to calculate the R signal Rc only when the pixel satisfies the first condition:

$Rm<Gm$ and $Rwb<Gm$ and $Rfwb>Gm$, and judges whether or not the pixel satisfies a following second condition, described above, to calculate the B signal Bc only when the pixel satisfies the second condition:

$Bm<Gm$ and $Bwb<Gm$ and $Bfwb>Gm$.

Note that although a case where the color video signal is the R signal, the G signal, and the B signal has been described above, the present invention is not limited to this. For example, the color video signal may be a complementary color signal or a color video signal including signals respectively having four or more colors.

Although the saturation Sr relating to R is calculated by Sr=Rwb/Gm and the saturation Sb relating to B is calculated by Sb=Bwb/Gm in foregoing description, a saturation calculated using another method may be used.

According to the first embodiment, the M-bit color video signal obtained by extending the N-bit color video signal is subjected to level correction based on a difference (M−N) between the respective numbers of bits at the time of bit extension and then subjected to white balance correction. Thus, the false color occurring in the chromatic color portion of the color video signal obtained by the bit extension can be simply and effectively reduced while eliminating the need to refer to a peripheral pixel (i.e., without requiring complicated processing with a heavy load).

Since the color video signal is subjected to level correction in the range defined by the level correction width $W=[\{2^{(M-N)}\}-1]$ (i.e., the range of the quantization error occurring by bit extension). Thus, the false color caused by the bit extension can be appropriately corrected without the color video signal being excessively corrected (i.e., without a sub-function being almost produced).

Since the color video signal is subjected to level correction in the range of Lm<Lc≤Lm+W, level correction appropriate for a case where bit extension is performed by multiplying the signal value of the color video signal by the value $\{2^{\wedge}(M-N)\}$ can be performed.

Particularly, in foregoing description, the color video signal is set to the R signal, the G signal, and the B signal, and only the R signal and the B signal are subjected to level correction and white balance correction. Thus, a signal value of the G signal as the luminance equivalent signal does not change in level correction and white balance correction. In other words, white balance correction can be advantageously performed by reducing the false color without almost changing brightness of the image.

At this time, when the R and B signals are subjected to level correction in following ranges defined by the level correction width W:

$Rm<Rc\le Rm+W$, and $Bm<Bc\le Bm+W$, the R and B signals can be subjected to appropriate level correction corresponding to the range of the quantization error.

Since the R signal Rc is calculated only when the pixel satisfies the following first condition:

$Rm<Gm$ and $Rwb<Gm$ and $Rfwb>Gm$, a false color component occurring in the R signal by bit extension can be satisfactorily reduced.

Since the B signal Bc is calculated only when the pixel satisfies the following second condition:

$Bm<Gm$ and $Bwb<Gm$ and $Bfwb>Gm$, a false color component occurring in the B signal by bit extension can be satisfactorily reduced.

Furthermore, if the R signal Rc is calculated when the pixel satisfies the first condition, as illustrated in FIG. 6, and the B signal Bc is calculated when the pixel satisfies the second condition, as illustrated in FIG. 7, a false color occurring in a low-saturation color in the vicinity of an achromatic color can also be effectively reduced.

On the other hand, if it is further judged whether or not the saturation satisfies the third condition higher than the predetermined threshold value, to calculate the R signal Rc only when the saturation satisfies the first condition and the third condition and calculate the B signal Bc only when the saturation satisfies the second condition and the third condition, level correction in a case where the saturation is low is not required so that a processing load can be reduced. Particularly, if the processing for reducing the false color occurring in the achromatic color portion is separately performed, as illustrated in step S6 in FIG. 3, processing efficiency can be increased.

At this time, it is judged whether or not the saturation Sb relating to B is higher than the first threshold value or the saturation relating to a complementary color of B is higher than the second threshold value as the judgment whether or not the saturation satisfies the third condition relating to the calculation of the R signal Rc. Thus, a noticeable false color, e.g., a false color of R of a type of being mixed into B or a complementary color of B can be effectively reduced.

It is judged whether or not the saturation Sr relating to R is higher than the third threshold value or the saturation relating to a complementary color of R is higher than the fourth threshold value as the judgment whether or not the saturation satisfies the third condition relating to the calculation of the B signal Bc. Thus, a noticeable false color, e.g., a false color of B of a type of being mixed into R or a complementary color of R can be effectively reduced.

Note that each of the above-described units other than the image processing unit 14 are also supposed to be configured to perform functions of the respective units by causing a processor including hardware such as CPU to execute software. However, the above-described units are not limited to such a configuration, but may be configured by a processor including electronic circuits (hardware) corresponding to the respective units. Any circuit may be mounted as a single circuit or may be mounted as a combination of a plurality of circuits if the circuit can perform an identical function. Further, any circuit is not limited to a circuit configured as a dedicated circuit for performing an intended function but may be configured to perform an intended function by causing a general-purpose circuit to execute a processing program.

Although the image processing apparatus has been mainly described above, the present invention may be an image processing method for performing similar processing to the processing performed by the image processing apparatus, an image processing program (computer program) for causing a computer to perform similar processing to the processing performed by the image processing apparatus, and a non-transitory computer readable recording medium recording the image processing program, for example.

Furthermore, the present invention is not limited to the embodiment described above as it is but can be embodied by modifying components without departing from the scope of the invention in an implementation stage. Various aspects of the invention can be formed by an appropriate combination of a plurality of components disclosed in the above-described embodiment. For example, some of all the components described in the embodiment may be deleted. Further, components over different embodiments may be appropriately combined. Thus, various modifications and applications can be made without departing from the spirit of the invention.

What is claimed is:

1. An image processing apparatus for processing a color video signal, the image processing apparatus comprising:
   a processor comprising hardware, the processor being configured to:
      extend an N-bit color video signal before white balance correction to an M-bit color video signal satisfying M>N;
      subject the M-bit color video signal obtained by the extension to level correction based on (M−N); and
      subject the color video signal subjected to the level correction to the white balance correction,
      wherein
   the processor calculates a level correction width W by a following equation:

$W=\{2^{(M-N)}\}-1$, and subjects the color video signal to the level correction in a range defined by the level correction width W.

2. The image processing apparatus according to claim 1, wherein
   the processor subjects the color video signal to the level correction in a following range when the color video signal before the level correction is represented by Lm and the color video signal after the level correction is represented by Lc:

$Lm<Lc\le Lm+W$.

3. The image processing apparatus according to claim 1, wherein
   the color video signal is an R signal, a G signal, and a B signal,
   the processor does not subject the G signal to the level correction but subjects the R signal and the B signal to the level correction, and
   the processor does not cause a signal value change by the white balance correction in the G signal but can cause a signal value change in the R signal and the B signal.

4. The image processing apparatus according to claim 3, wherein
   when the R and B signals before the level correction are respectively represented by Rm and Bm, and the R and B signals after the level correction are respectively represented by Rc and Bc, the processor subjects the R and B signals to the level correction in following ranges defined by the level correction width W:

$Rm<Rc\le Rm+W$, and $Bm<Bc\le Bm+W$.

5. The image processing apparatus according to claim 4, wherein
   the processor acquires white balance gains Rgain and Bgain respectively corresponding to the R and B signals in the white balance correction before the white balance correction, calculates for each pixel following values when the G signal is represented by Gm and maximum level correction values of the R and B signals are respectively represented by Rf and Bf:

$Rf=Rm+W$, $Bf=Bm+W$, $Rwb=Rm\times Rgain$, $Bwb=Bm\times Bgain$, $Rfwb=Rf\times Rgain$, and $Bfwb=Bf\times Bgain$, judges whether or not the pixel satisfies a following first condition:

$Rm<Gm$, $Rwb<Gm$ and $Rfwb>Gm$, calculates the R signal Rc only when the pixel satisfies the first condition,
further judges whether or not the pixel satisfies a following second condition:

$Bm<Gm$, $Bwb<Gm$ and $Bfwb>Gm$, and calculates the B signal Bc only when the pixel satisfies the second condition.

6. The image processing apparatus according to claim 5, wherein
   the processor calculates for each pixel a saturation based on an R signal Rwb, the G signal Gm, and a B signal Bwb obtained by performing the white balance correction without performing the level correction, further judges whether or not the saturation satisfies a third condition higher than a predetermined threshold value, calculates the R signal Rc only when the saturation satisfies the first condition and the third condition, and calculates the B signal Bc only when the saturation satisfies the second condition and the third condition.

7. The image processing apparatus according to claim 6, wherein the processor judges whether or not a saturation relating to B is higher than a first threshold value or a saturation relating to a complementary color of B is higher than a second threshold value as a judgment whether or not the saturation satisfies the third condition relating to the calculation of the R signal Rc, and judges whether or not a saturation relating to R is higher than a third threshold value or a saturation relating to a complementary color of R is higher than a fourth threshold value as a judgment whether or not the saturation satisfies the third condition relating to the calculation of the B signal Bc.

8. An image processing method for processing a color video signal, the method comprising:
- extending an N-bit color video signal before white balance correction to an M-bit color video signal satisfying M>N;
- subjecting the M-bit color video signal obtained by the extension to level correction based on (M−N); and
- subjecting the color video signal subjected to the level correction to the white balance correction, wherein
- the level correction for the color video signal includes calculating a level correction width W by a following equation:

$$W=\{2^{(M-N)}\}-1, \text{ and}$$

is performed in a range defined by the level correction width W.

9. The image processing method according to claim 8, wherein
- the color video signal is an R signal, a G signal, and a B signal,
- the level correction is not performed for the G signal but is performed for the R signal and the B signal, and
- the white balance correction does not cause a signal value change in the G signal but can cause the signal value change in the R signal and the B signal.

10. A computer readable recording medium recording an image processing program for causing a computer to process a color video signal, the image processing program causing the computer to:
- extend an N-bit color video signal before white balance correction to an M-bit color video signal satisfying M>N;
- subject the M-bit color video signal obtained by the extension to level correction based on (M−N); and
- subject the color video signal subjected to the level correction to the white balance correction, wherein
- the level correction for the color video signal includes calculating a level correction width W by a following equation:

$$W=\{2^{(M-N)}\}-1, \text{ and}$$

is performed in a range defined by the level correction width W.

11. The recording medium according to claim 10, wherein
- the color video signal is an R signal, a G signal, and a B signal,
- the level correction is not performed for the G signal but is performed for the R signal and the B signal, and
- the white balance correction does not cause a signal value change in the G signal but can cause the signal value change in the R signal and the B signal.

* * * * *